(12) United States Patent
Kato

(10) Patent No.: US 10,140,950 B2
(45) Date of Patent: Nov. 27, 2018

(54) DISPLAY DEVICE DRIVING METHOD AND VIDEO DISPLAY APPARATUS

(71) Applicant: JOLED INC., Tokyo (JP)

(72) Inventor: Toshiyuki Kato, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 15/347,863

(22) Filed: Nov. 10, 2016

(65) Prior Publication Data

US 2017/0132987 A1    May 11, 2017

(30) Foreign Application Priority Data

Nov. 11, 2015   (JP) .................................. 2015-221688

(51) Int. Cl.
| | |
|---|---|
| G09G 3/36 | (2006.01) |
| G09G 5/00 | (2006.01) |
| H04N 5/04 | (2006.01) |
| G09G 5/12 | (2006.01) |
| H04N 21/242 | (2011.01) |
| H04N 21/43 | (2011.01) |
| H04N 21/443 | (2011.01) |
| H04N 21/8547 | (2011.01) |

(52) U.S. Cl.
CPC .............. *G09G 5/006* (2013.01); *G09G 5/12* (2013.01); *H04N 5/04* (2013.01); *H04N 21/242* (2013.01); *H04N 21/4307* (2013.01); *H04N 21/4436* (2013.01); *H04N 21/8547* (2013.01); *G09G 2310/061* (2013.01); *G09G 2310/08* (2013.01); *G09G 2360/18* (2013.01); *G09G 2370/04* (2013.01)

(58) Field of Classification Search
CPC .................... G09G 5/006; H04N 5/04

USPC ........................................................... 345/99
See application file for complete search history.

(56) References Cited

U.S. PATENT DOCUMENTS

| | | | |
|---|---|---|---|
| 5,926,174 A | 7/1999 | Shibamiya et al. | |
| 2010/0128176 A1* | 5/2010 | Nakajima | ............. G09G 5/006<br>348/512 |

(Continued)

FOREIGN PATENT DOCUMENTS

| | | |
|---|---|---|
| JP | 03-045086 | 2/1991 |
| JP | 09-200660 | 7/1997 |
| JP | 2013-186469 | 9/2013 |

OTHER PUBLICATIONS

U.S. Appl. No. 15/123,087 to Hiroaki Ishii, filed Sep. 1, 2016.

*Primary Examiner* — Roy P Rabindranath
(74) *Attorney, Agent, or Firm* — Greenblum & Bernstein, P.L.C.

(57) ABSTRACT

The present disclosure provides a display device driving method and the like that can suppress degradation of display quality at the time of switching to a video based on a video signal from an external signal source. The display device driving method according to the present disclosure includes: receiving a training signal transmitted from an external signal source; after receiving the training signal, transmitting a lock signal to the external signal source at a timing based on an internal synchronization signal of the display device; after transmitting the lock signal, receiving a video signal that is transmitted from the external signal source and is synchronous with an external synchronization signal; and displaying a video by using the video signal received from the external signal source.

18 Claims, 8 Drawing Sheets

(56) References Cited

U.S. PATENT DOCUMENTS

| | | | |
|---|---|---|---|
| 2013/0159565 A1* | 6/2013 | Soyannwo | G06F 9/452 |
| | | | 710/33 |
| 2013/0235055 A1 | 9/2013 | Kim et al. | |
| 2013/0235941 A1* | 9/2013 | Koo | G09G 5/006 |
| | | | 375/240.26 |
| 2013/0329138 A1* | 12/2013 | Minemura | G09G 5/006 |
| | | | 348/720 |
| 2014/0168233 A1* | 6/2014 | Brijesh | G09G 3/2096 |
| | | | 345/520 |
| 2014/0240604 A1* | 8/2014 | Toba | H04N 21/43635 |
| | | | 348/723 |

* cited by examiner

DISPLAY DEVICE DRIVING METHOD AND VIDEO DISPLAY APPARATUS

CROSS REFERENCE TO RELATED APPLICATION

The present application is based on and claims priority of Japanese Patent Application No. 2015-221688 filed on Nov. 11, 2015. The entire disclosure of the above-identified application, including the specification, drawings and claims is incorporated herein by reference in its entirety.

FIELD

The present disclosure relates to a display device driving method and a video display apparatus including the display device.

BACKGROUND

Conventionally, it is known that in a display apparatus that includes a display device, a configuration is used that switches the driving state of the display device when displaying an unchanged image (still image) and when displaying other images (see, for example, Patent Literature (PTL) 1). To be specific, the display apparatus is configured to operate the display device by enabling (activating) PSR (Panel Self Refresh) driving when displaying an unchanged image and operate the display device by disabling (deactivating) the PSR driving when displaying other images.

CITATION LIST

Patent Literature

[PTL 1]
Japanese Unexamined Patent Application Publication No. 2013-186469

SUMMARY

Technical Problem

However, the conventional display apparatus described above may require a longer time until a synchronization signal for controlling the display on the display device is stabilized.

For example, in a state in which the PSR driving is enabled, the display device displays an image by using an internal synchronization signal generated within the display device. On the other hand, in a state in which the PSR driving is disabled, the display device displays a video by using an external synchronization signal that is synchronous with a video signal input from an external device. Accordingly, with the display device, at the time when the driving state is switched, the synchronization signal for controlling the display is also switched from the internal synchronization signal to the external synchronization signal.

At the time of switching the synchronization signal, a longer time is required to stabilize the synchronization signal as the phase difference between the internal synchronization signal and the external synchronization signal increases. In addition, during a period until the synchronization signal is stabilized, degradation of display quality such as variations in display luminance (flicker) may occur. Accordingly, in order to suppress degradation of display quality, it is necessary to reduce the time required to stabilize the synchronization signal.

However, the internal synchronization signal and the external synchronization signal are signals that are independent of each other, and thus the phase difference between the internal synchronization signal and the external synchronization signal is random at the time of switching the synchronization signal. Accordingly, it is difficult to reduce the time required to stabilize the synchronization signal, and thus there is a possibility of occurrence of degradation of display quality.

The present disclosure has been made in order to solve the problem described above, and it is an object of the present disclosure to provide a display device driving method that can suppress degradation of display quality at the time of switching to video based on a video signal from an external signal source.

Solution to Problem

In order to solve the problem described above, a display device driving method according to an aspect of the present disclosure includes: receiving a training signal transmitted from an external signal source; after receiving the training signal, transmitting a lock signal to the external signal source at a timing based on an internal synchronization signal of the display device; after transmitting the lock signal, receiving a video signal that is transmitted from the external signal source and is synchronous with an external synchronization signal; and displaying a video by using the video signal received from the external signal source.

A video display apparatus according to an aspect of the present disclosure is a video display apparatus video display apparatus including an external signal source and a display device, wherein the display device performs operations of: receiving a training signal transmitted from the external signal source; after receiving the training signal, upon completion of preparation of the display device, transmitting a lock signal to the external signal source at a timing based on an internal synchronization signal of the display device; after transmitting the lock signal, receiving a video signal that is transmitted from the external signal source and is synchronous with an external synchronization signal; and displaying a video by using the video signal received from the external signal source.

Advantageous Effects

According to the display device driving method of the present disclosure, it is possible to suppress degradation of display quality at the time of switching to video based on a video signal from an external signal source.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT

Figure 1:
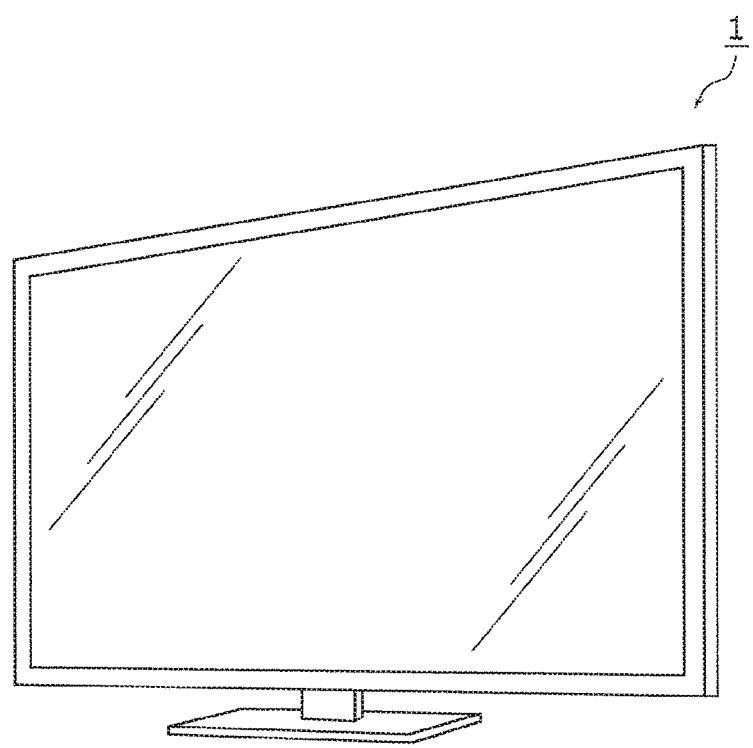
FIG. 1 is an external view of a video display apparatus according to an embodiment.

Hereinafter, a display device driving method and a video display apparatus according to an embodiment will be described with reference to the drawings. Note that the embodiment described below shows a preferred specific example of the present disclosure. Accordingly, the numerical values, structural elements, the arrangement and connection of the structural elements, steps, the order of the steps, etc. shown in the following embodiment are merely examples, and therefore do not limit the present disclosure. Accordingly, among the structural elements described in the following embodiment, structural elements not recited in any one of the independent claims are described as arbitrary structural elements.

The diagrams are schematic representations, and thus are not true to scale. Also, structural elements that are substantially the same are given the same reference numerals, and a redundant description will be omitted or simplified.

[1. Configuration]

Figure 2:
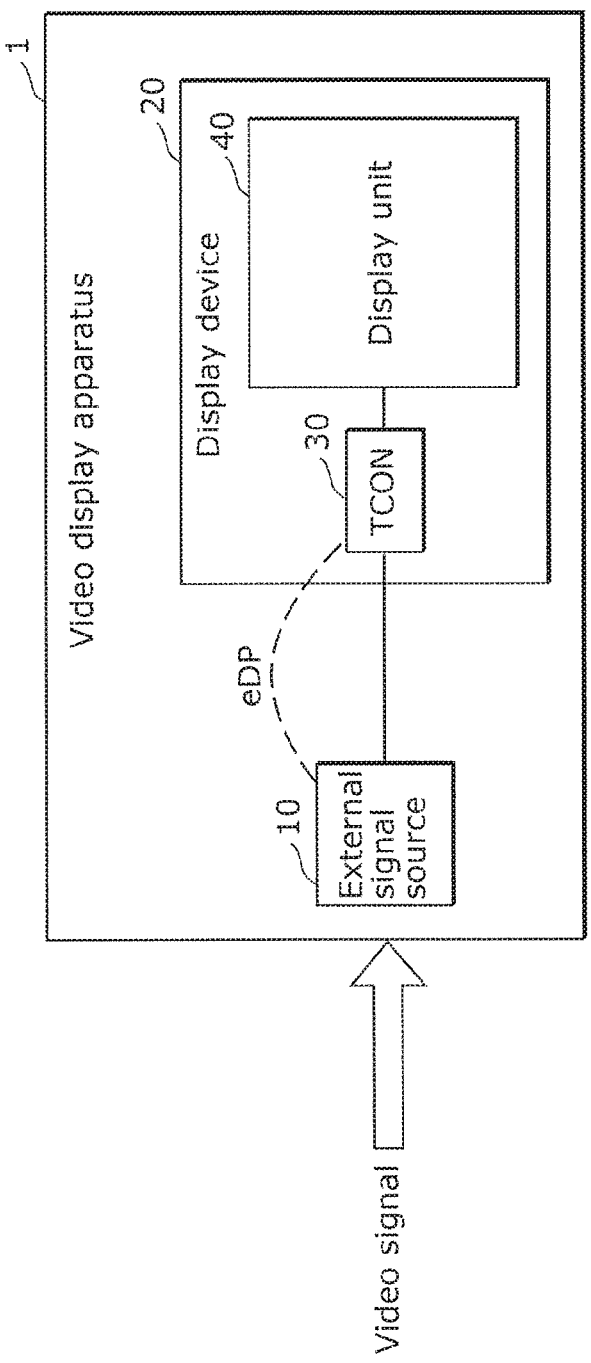
FIG. 2 is a block diagram showing a configuration of the video display apparatus according to the embodiment.

FIG. 1 is an external view of a video display apparatus 1 according to the present embodiment. FIG. 2 is a block diagram showing a configuration of the video display apparatus 1 according to the present embodiment.

The video display apparatus 1 shown in the diagrams is, for example, a television set that displays a video according to a video signal, such as a broadcast signal, transmitted from a broadcasting station provided external to the video display apparatus 1.

As shown in FIG. 2, the video display apparatus 1 includes an external signal source 10 and a display device 20.

The external signal source 10 is a signal source that transmits a video signal and an external synchronization signal to the display device 20, and can be, for example, a Set, a STB (Set Top Box), a tuner or the like that receives a video signal transmitted from a broadcasting station, converts the received video signal to a video signal suitable for the display device 20, and transmits the converted video signal. The external signal source 10 decodes, for example, an input video signal, and transmits the decoded video signal and an external synchronization signal that is synchronous with the video signal to the display device 20.

The display device 20 is, for example, an organic EL (Electro Luminescent) display that displays a video by using the video signal and the external synchronization signal received from the external signal source 10. The display device 20 includes, for example, a TCON 30 and a display unit 40.

The external signal source 10 and the display device 20 are connected so as to be capable of communication with each other via an eDP interface that conforms to eDP (embedded Display Port) standard. In the present embodiment, the eDP standard supports PSR driving that enables power saving of the video display apparatus 1 as a whole and extension of battery (not shown) life, and the external signal source 10 and the display device 20 are configured to support the PSR driving. That is, the display device 20 has a PSR-enabled mode in which the PSR driving is enabled and a PSR-disabled mode in which the PSR driving is disabled.

The external signal source 10 and the display device 20 may further include a CPU (Central Processing Unit), a storage medium such as a ROM (Read Only Memory) in which a control program is stored, a work memory such as a RAM (Random Access Memory) and a communication circuit, but illustration of these components is omitted in the diagrams.

The TCON 30 is a timing controller that, by using the video signal and the external synchronization signal transmitted from the external signal source 10, displays a video according to the video signal on the display unit 40. To be specific, the TCON 30 provides a light emission timing of each row of pixels in the display unit 40 and a write timing of a signal voltage for causing the display unit 40 to emit light with a luminance corresponding to the video signal by outputting, together with the video signal, synchronization signals such as a vertical synchronization signal (Vsync) and a horizontal synchronization signal (Hsync) to a gate driver (not shown) and a source driver (not shown) included in the display unit 40.

The display unit 40 is a pixel array including a plurality of pixels arranged in a matrix. The plurality of pixels are disposed at positions where a plurality of gate lines (scan lines) connected to the gate driver and a plurality of source lines (data lines) connected to the source driver intersect. For example, each pixel includes an organic EL element that emits light according to the signal voltage and a driving transistor that drives the organic EL element.

[2. Operations]

With the video display apparatus 1 configured as described above, the PSR driving is enabled when the input video signal indicates a still image, and the PSR driving is disabled when the input video signal indicates a moving image. Hereinafter, operations (driving method) of the display device 20 will be described together with a detailed configuration example of the display device 20.

[2.1. PSR-Enabled Mode and PSR-Disabled Mode]

First, the operations of the display device 20 when it is in a mode in which the PSR driving is enabled (hereinafter referred to as PSR-enabled mode) and when it is in a mode in which the PSR driving is disabled (hereinafter referred to as PSR-disabled mode) will be described.

Figure 3:
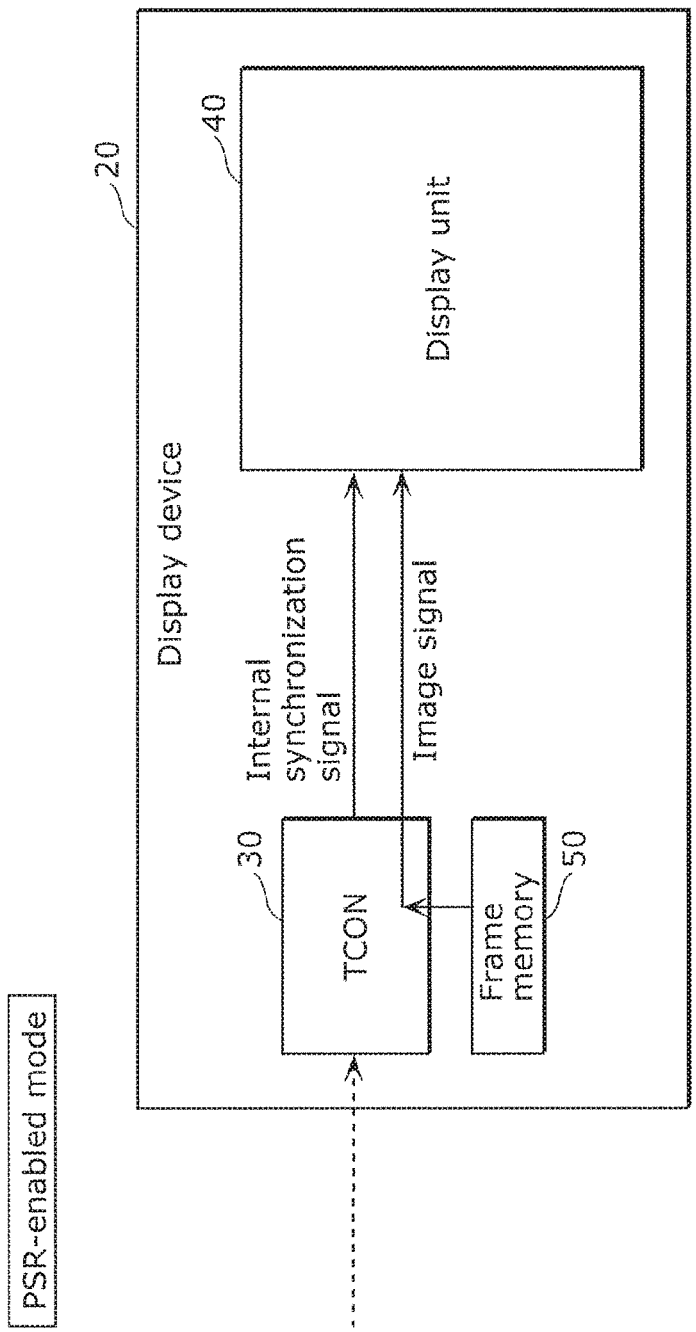
FIG. 3 is a block diagram schematically showing operations of a display device when it is in a PSR-enabled mode according to the embodiment.
Figure 4:
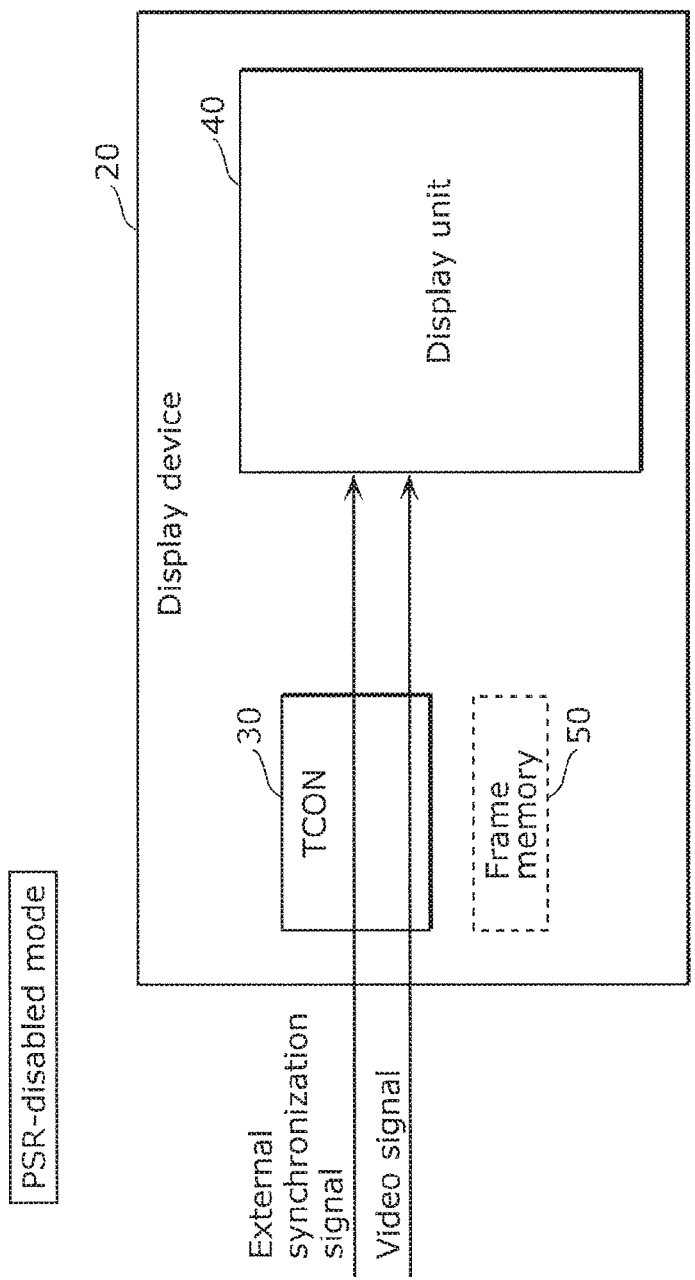
FIG. 4 is a block diagram schematically showing operations of the display device when it is in a PSR-disabled mode according to the embodiment.

FIG. 3 is a block diagram schematically showing the operations of the display device 20 when it is in the PSR-enabled mode according to the present embodiment. FIG. 4 is a block diagram schematically showing the operations of the display device 20 when it is in the PSR-disabled mode according to the present embodiment.

As shown in these diagrams, the display device 20 includes, for example, a frame memory 50 in order to support the PSR driving.

The frame memory 50 is a memory for storing information (image data) indicating a predetermined image. In the present embodiment, the frame memory 50 stores images to be displayed on the display unit 40 when the display device 20 is in the PSR-enabled mode. In the present embodiment, the frame memory 50 writes therein image data by using a method and a timing specified by the eDP standard, and stores therein the image data of the final frame in the PSR-disabled mode.

As shown in FIG. 3, in the PSR-enabled mode, the display device 20 displays the above-described predetermined image on the display unit 40 by using, instead of the video signal and the external synchronization signal from the external signal source 10, an image signal corresponding to the information stored in the frame memory 50 and an internal synchronization signal.

As used herein, the internal synchronization signal is a synchronization signal that is generated by a signal generator or the like provided in the display device 20 and is output from the TCON 30 to the display unit 40.

On the other hand, as shown in FIG. 4, in the PSR-disabled mode, the display device 20 displays a video on the display unit 40 by using the video signal and the external synchronization signal from the external signal source 10.

[2.2. Transition from PSR-Enabled Mode to PSR-Disabled Mode]

The display device 20 that performs operation as described above performs transition from the PSR-enabled mode to the PSR-disabled mode in the manner as described below when the video single input into the video display apparatus 1 is switched from a signal indicating a still image to a signal indicating a moving image.

Figure 5:
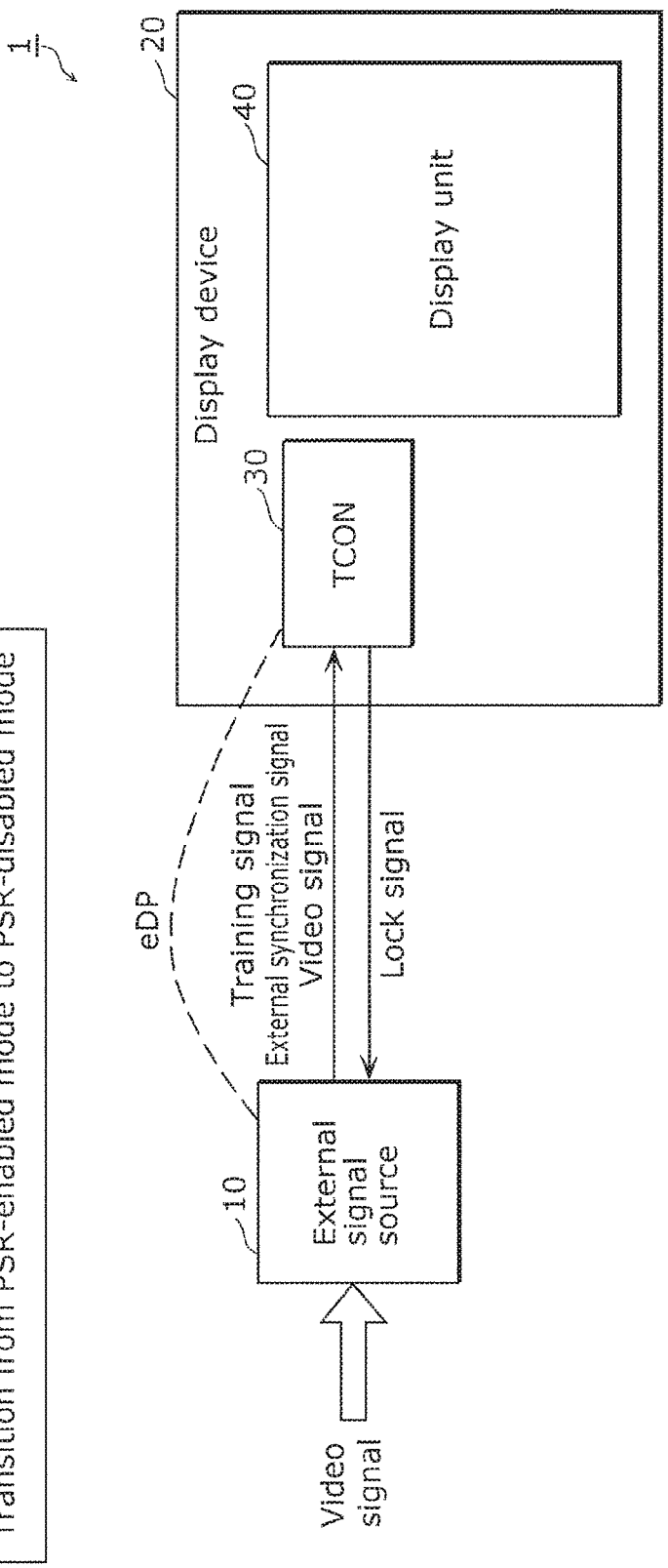
FIG. 5 is a block diagram schematically showing transmission and reception of signals between an external signal source and the display device at the time of transition from the PSR-enabled mode to the PSR-disabled mode according to the embodiment.

FIG. 5 is a block diagram schematically showing transmission and reception of signals between the external signal source 10 and the display device 20 at the time of transition according to the present embodiment.

As shown in the diagram, the transition from the PSR-enabled mode to the PSR-disabled mode is performed by the external signal source 10 and the display device 20 transmitting and receiving a training signal, a lock signal, a video signal and an external synchronization signal via the eDP interface. Hereinafter, the operations performed at the time of transition from the PSR-enabled mode to the PSR-disabled mode will be described.

[2-2-1. Basic Operations]

Figure 6:
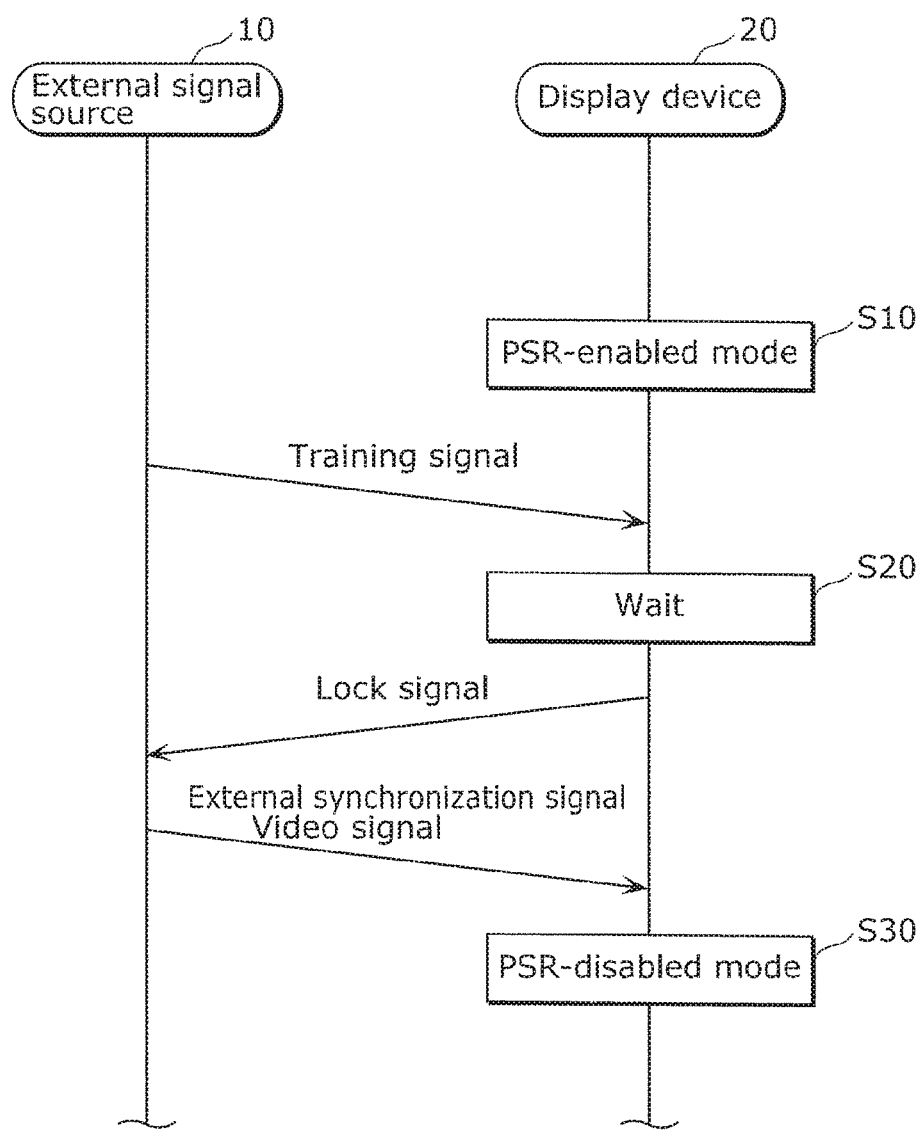
FIG. 6 is a sequence diagram showing basic operations of the external signal source and the display device according to the embodiment.

FIG. 6 is a sequence diagram showing the basic operations of the external signal source 10 and the display device 20 at the time of transition from the PSR-enabled mode to the PSR-disabled mode according to the embodiment.

First, the display device 20 performs operation in the PSR-enabled mode (S10). That is, a predetermined image is displayed on the display unit 40 by using the image data stored in the frame memory 50.

Next, when the video signal input into the video display apparatus 1 is switched from a signal indicating a still image to a signal indicating a moving image, the external signal source 10 transmits a training signal to the display device 20. That is, the display device 20 receives the training signal transmitted from the external signal source 10.

Here, the external signal source 10 determines that the video signal has been switched from a signal indicating a still image to a signal indicating a moving image by using, for example, the amount of change of the video signal between adjacent frames. To be specific, the external signal source 10 determines that the video signal has been switched if the amount of change exceeds a predetermined threshold value from a value less than or equal to the threshold value, and transmits a training signal.

The training signal is a signal for inquiring whether or not the display device 20 is ready to accept the video signal transmitted from the external signal source 10. In other words, in the present embodiment, the training signal is a signal for inquiring whether or not to permit deactivation of the PSR-enabled mode so as to allow transition to the PSR-disabled mode.

Next, after the display device 20 has received the training signal, the display device 20 transmits a lock signal to the external signal source 10 at a timing based on the internal synchronization signal of the display device 20. That is, the display device 20 waits until the timing based on the internal synchronization signal is reached (S20), and transmits a lock signal. A detailed timing at which the display device 20 transmits a lock signal will be described later.

Here, the lock signal is a signal indicating that the display device 20 is ready to accept the video signal. In other words, the lock signal is a signal that permits the external signal source 10 to transmit the video signal to the display device 20, and in the present embodiment, is a signal for permitting deactivation of the PSR-enabled mode so as to allow transition to the PSR-disabled mode.

That is, upon receiving the training signal, the display device 20 determines whether or not it is ready to accept the video signal from the external signal source 10. For example, if a predetermined conditions is satisfied such as if a training code included in the training signal has been successfully received or if the display device 20 becomes ready after receiving the training signal, the display device 20 determines that it is ready to accept the video signal, and transmits the lock signal at a predetermined timing. If, on the other hand, the above-described predetermined condition is not satisfied, the display device 20 determines that it is not ready to accept the video signal, and does not perform transmission of the lock signal. In this case, the display device 20 may transmit a signal such as a NAK signal that indicates that it is not ready to accept the video signal.

Next, the external signal source 10 that has received the lock signal transmits a video signal and an external synchronization signal. That is, after the display device 20 has transmitted the lock signal, the display device 20 receives a video signal that is transmitted from the external signal source 10 and is synchronous with an external synchronization signal.

Then, the display device 20 displays a video by using the received video signal. To be specific, the display device 20 switches the predetermined image to the video and displays the video. That is, in this case, the video is displayed in the PSR-disabled mode (S30). As a result, a video corresponding to a video signal transmitted from, for example, a broadcasting station or the like is displayed.

Through the operations described above, the display device 20 performs transition from the PSR-enabled mode in which a predetermined image (still image) is displayed to the PSR-disabled mode in which a video (moving image) is displayed.

[2-2-2. Detailed Operations]

Next, the detailed operations of the display device 20 at the time of transition from the PSR-enabled mode to the PSR-disabled mode will be described.

Figure 7:
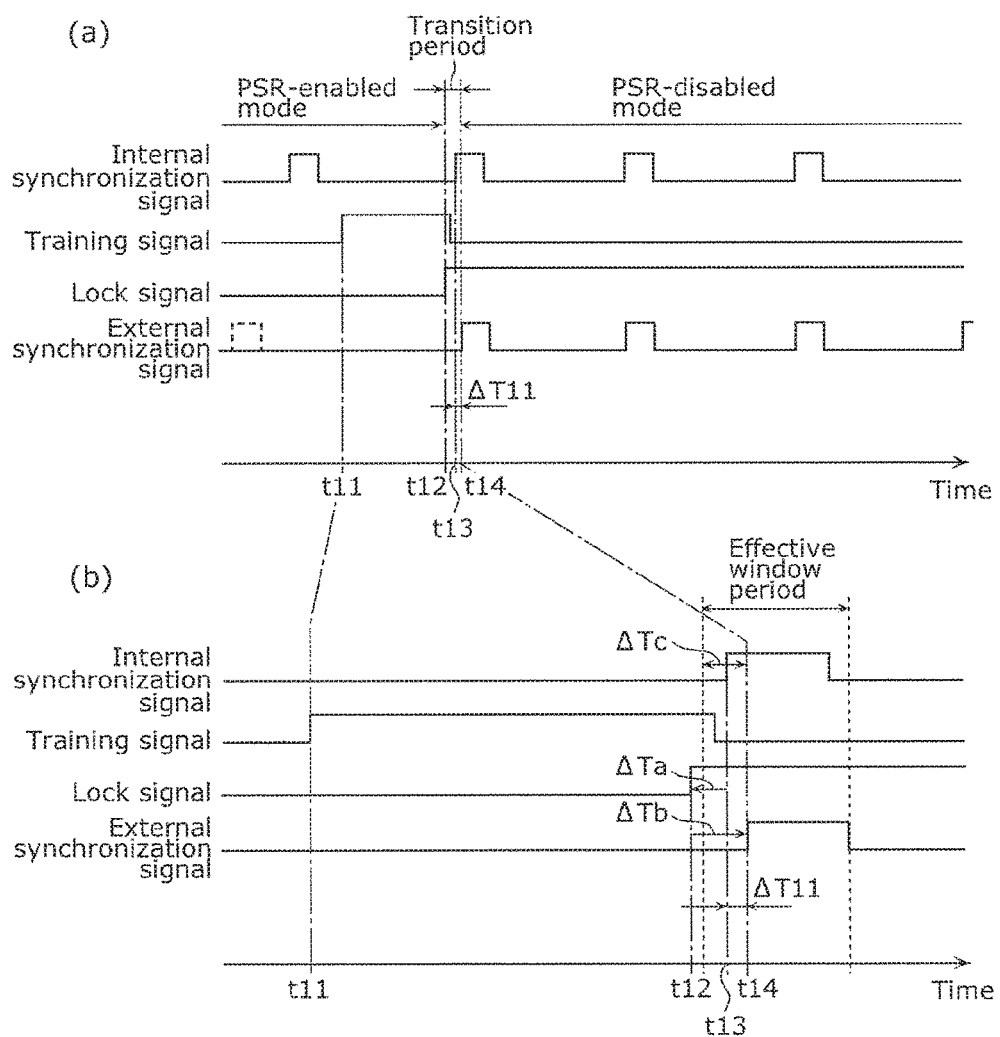
FIG. 7 shows timing charts showing in (a) and (b) detailed operations of the display device according to the embodiment.

FIG. 7 shows timing charts showing the detailed operations of the display device 20 according to the present embodiment during a transition period from the PSR-enabled mode to the PSR-disabled mode. To be specific, (a) in FIG. 7 is a timing chart showing operations performed during the transition period and a period before and after the transition period, and (b) in FIG. 7 is a timing chart showing the time axis of a relevant part in (a) in FIG. 7 in an enlarged manner. In each of (a) and (b) in FIG. 7, the timings of an internal synchronization signal, a training signal, a lock signal and an external synchronization signal are shown in order from the top. The pulse of the external synchronization signal before the lock signal is transmitted (before a leading edge of the lock signal in the diagram) is indicated by a broken line. The same applies to other timing charts described below.

As shown in the diagrams, the display device 20 according to the present embodiment transmits, after receiving the training signal at time t11, a lock signal at time t12, which is the timing based on the internal synchronization signal. Then, at time t14, the display device 20 receives a video signal and an external synchronization signal transmitted from the external signal source 10 that have received the lock signal.

At this time, as shown in FIG. 7, in the present embodiment, the phase shift between the internal synchronization signal and the external synchronization signal is relatively small. To be specific, the shift (difference) ΔT11 (=|t13−t14|) between an edge of the internal synchronization signal and an edge of the external synchronization signal is relatively small.

For this reason, the display device 20 can switch the synchronization signal for controlling the display on the display unit from the internal synchronization signal to the external synchronization signal.

Here, in the display device 20, an effective window period, which is a period during which a received signal is enabled, is limited. The effective window period is specified by the internal synchronization signal, and for example, is specified by the phase of the internal synchronization signal.

The temporal duration of the effective window period can be set to any length. The longer the temporal duration, the shorter the time required to stabilize the synchronization signal for controlling the display on the display unit 40. However, a longer temporal duration may increase the possibility of the occurrence of a problem such as flicker, which causes degradation of display quality. Degradation of display quality caused by flicker is prominent particularly in organic EL displays. Accordingly, from the viewpoint of display quality, it is preferable that the effective window period is set to a value that is not greater than necessary.

On the other hand, the shorter the temporal duration of the effective window period, the lower the possibility of the occurrence of degradation of display quality caused by flicker or the like. However, a signal that is not received during the effective window period is disabled, and thus a shorter temporal duration causes the transition period from the PSR-enabled mode to the PSR-disabled mode to be increased. That is, a longer time may be required to display a video (external video signal) based on the video signal from an external signal source, or frame skipping may occur in the display based on the external video signal.

As described above, suppression of degradation of display quality caused by flicker or the like (the problem of display quality) and reduction of the time required to successfully display a video based on the external video signal are in trade-off relationship.

For this reason, in order to reduce the time while suppressing degradation of display quality, it is preferable that the external synchronization signal is received while the effective window period is set to a value that is not greater than necessary. To be specific, it is most preferable that an initial pulse of the external synchronization signal is received within the effective window period.

In the present embodiment, the initial pulse of the external synchronization signal after transmitting the lock signal is received at time t14, which is a timing within the effective window period. Accordingly, the display device 20 according to the present embodiment can enable the initial pulse of the received external synchronization signal. Thus, the display device 20 can switch the synchronization signal for controlling the display on the display unit from the internal synchronization signal to the external synchronization signal by using the initial pulse of the received external synchronization signal.

In view of the above facts, in the present embodiment, when the display device 20 is ready to accept the video signal, the lock signal is transmitted at a timing (time t12) at which the internal synchronization signal has a predetermined phase. In other words, the lock signal is transmitted at a timing (time t12) that is prior to a timing (time t13) of the edge of the internal synchronization signal by a predetermined length of time (ΔTa). To be specific, the lock signal transmitting timing (time t12) is a timing at which the external synchronization signal is received within the effective window period of the internal synchronization signal which is a period during which a received signal is enabled when the video signal is received from the external signal source 10. With this configuration, the initial pulse of the external synchronization signal can be enabled.

The lock signal transmitting timing is the following timing, for example.

To be specific, a time ΔTb (=t14−t12) required from transmission of the lock signal by the display device 20 until reception of the external synchronization signal is uniquely determined by, for example, the connection between the display device 20 and the external signal source 10, internal delay in each of the display device 20 and the external signal source 10 and the like. Accordingly, the display device 20 may transmit the lock signal at a timing at which the timing after the time ΔTb is within the effective window period. Also, a time difference ΔTc between the timing of start of the effective window period and the edge of the pulse of the internal synchronization signal is uniquely determined from the temporal duration set for the effective window period.

Accordingly, by setting the lock signal transmitting timing to a timing that is prior to the edge of the internal synchronization signal by the predetermined length of time ΔTa (where ΔTa satisfies the following relationship: ΔTa<ΔTb+ΔTc), the external synchronization signal can be received within the effective window period.

Through the operations described above, the display device 20 can reduce the transition period from the PSR-enabled mode in which a predetermined image (still image) is displayed to the PSR-disabled mode in which a video (moving image) is displayed.

[3. Summation]

Advantageous effects and the like produced by the display device 20 according to the present embodiment described above will be described next in comparison with a comparative example.

A display device according to a comparative example is different from the display device 20 according to the present embodiment in terms of the lock signal transmitting timing. To be specific, the display device 20 according to the embodiment is configured to, after receiving the training signal, wait until a timing based on the internal synchronization signal is reached (S20 in FIG. 6) and then transmit the lock signal. In contrast, the display device according to the comparative example is configured to, after receiving the training signal, transmit the lock signal without waiting for the timing.

Figure 8:
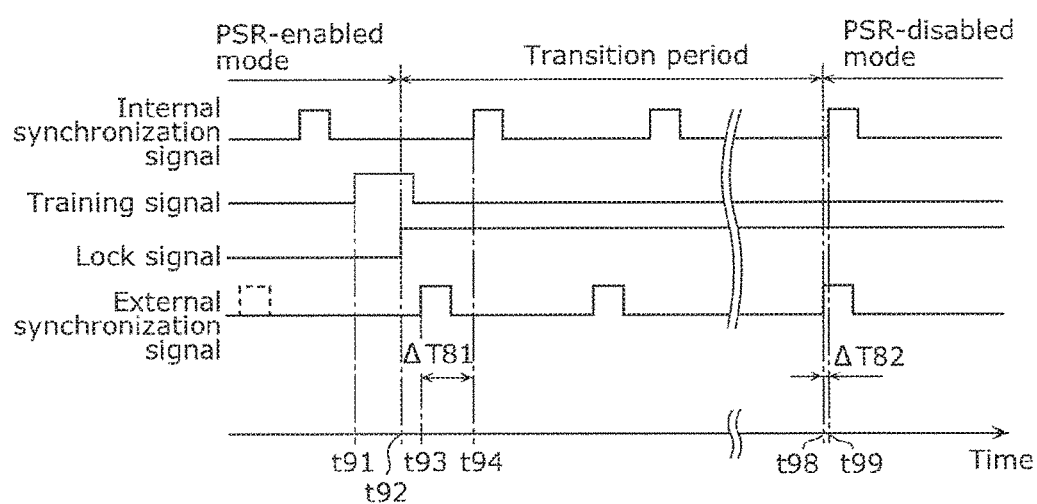
FIG. 8 is a timing chart showing detailed operations of a display device according to a comparative example.

FIG. 8 is a timing chart showing the detailed operations of the display device according to the comparative example during a transition period from the PSR-enabled mode to the PSR-disabled mode.

As shown in the diagram, when the display device according to the comparative example receives the training signal at time t91, the display device transmits the lock signal at time t92.

If it is assumed here that the training signal receiving timing is the same between the embodiment and the comparative example, the lock signal transmitting timing in the comparative example is earlier than that in the embodiment (if it is assumed that t91=t11, t92≤t12). That is, in the embodiment, even if it is determined that the display device is ready to accept the video signal, the display device waits until a timing (time t12) based on the internal synchronization signal is reached, and then transmits the lock signal. In contrast, in the comparative example, if it is determined that the display device is ready to accept the video signal, the display device immediately transmits the lock signal. That is, in the comparative example, the lock signal is transmitted at a timing (time t92) that has nothing to do with the internal synchronization signal.

Then, the video signal and the external synchronization signal transmitted from the external signal source 10 that has received the lock signal are received at time t93.

At this time, as shown in FIG. 8, the phase shift between the internal synchronization signal and the external synchronization signal may become large. To be specific, the shift (difference) ΔT81 (=|t94−t93|) between an edge of the internal synchronization signal and an edge of the external synchronization signal may become large. This occurs as a result of the lock signal being transmitted at the timing that has nothing to do with the internal synchronization signal and thus the external synchronization signal being also transmitted at the timing that has nothing to do with the internal synchronization signal. That is, a phase shift occurs between the internal synchronization signal and the external synchronization signal, and the phase shift may become large.

In such a case, the display device according to the comparative example may not be able to switch the synchronization signal for controlling the display on the display unit 40 from the internal synchronization signal to the external synchronization signal. That is, in the comparative example, as a result of the external synchronization signal being not received within the effective window period of the internal synchronization signal, the external synchronization signal may be disabled.

Consequently, in the comparative example, the transition period from the PSR-enabled mode to the PSR-disabled mode continues over a plurality of frames until the difference (here, ΔT82 (=|t99−t98|)) between the timing of an edge of the external synchronization signal and the timing of an edge of the internal synchronization signal becomes small. That is, a plurality of frames are required to stabilize the synchronization signal for controlling the display on the display unit 40, which causes degradation of display quality.

In contrast, according to the method for driving the display device 20 of the embodiment, after the training signal is received, the lock signal is transmitted to the external signal source 10 at a timing based on the internal synchronization signal of the display device 20.

Here, if the time required from transmission of the lock signal until reception of the video signal has been uniquely set, the phase of the external synchronization signal can be managed (adjusted) at the timing at which the lock signal is transmitted. Accordingly, by transmitting the lock signal at a timing based on the internal synchronization signal, the phase difference between the internal synchronization signal and the external synchronization signal can be managed. For this reason, by transmitting the lock signal at a timing at which the phase difference is small, it is possible to reduce the time required for the synchronization signals (Vsync, Hsync and the like in the present embodiment) for controlling the display on the display device 20 to stabilize. Accordingly, it is possible to suppress degradation of display quality when the displayed video is switched to a video based on the video signal from the external signal source 10.

The time required from transmission of the lock signal until reception of the video signal does not need to be uniquely set, and it may be set in a predetermined range. In this case as well, the same effects can be produced. To be specific, in this case as well, the range of the phase of the external synchronization signal can be managed at the timing at which the lock signal is transmitted, and thus the phase difference between the internal synchronization signal and the external synchronization signal can be managed in a predetermined range. Accordingly, for example, the lock signal may be transmitted at a timing at which the timing after a maximum time ΔTmax of the predetermined range is within the effective window period.

Also, with the method for driving the display device 20 according to the present embodiment, the training signal is a signal for inquiring whether or not the display device 20 is ready to accept the video signal, and the lock signal is a signal indicating that the display device 20 is ready to accept the video signal.

With this configuration, in the event of the occurrence of, for example, a problem such as degradation of communication status between the external signal source 10 and the display device 20, the lock signal is not transmitted. Accordingly, for example, in this case, by changing the communication condition such as reducing the communication rate between the external signal source 10 and the display device 20, it is possible to avoid the problem.

Also, with the method for driving the display device 20 according to the present embodiment, the lock signal is transmitted at a timing at which the internal synchronization signal has a predetermined phase when the display device 20 is ready to accept the video signal.

With this configuration, the phase difference between the internal synchronization signal and the external synchronization signal can be managed with high accuracy. For this reason, for example, even when the effective window period is short, the time required to stabilize the synchronization signal can be reduced. Accordingly, degradation of display quality can be further suppressed.

Also, with the method for driving the display device 20 according to the present embodiment, the lock signal transmitting timing is a timing at which the external synchronization signal is received within the effective window period in the processing of receiving the video signal from the external signal source 10.

With this configuration, the received external synchronization signal is enabled (in the embodiment, the initial pulse of the external synchronization signal is enabled) in a very short time, and thus the time required to stabilize the synchronization signal can be minimized. Accordingly, degradation of display quality can be further suppressed.

Also, with the method for driving the display device 20 according to the present embodiment, in the processing of displaying a video by using the video signal received from the external signal source, the predetermined image being displayed is switched to the video so as to display the video. With this configuration, by, for example, displaying an unexpected video during a period until the video starts to be displayed, a problem such as degradation of the display device can be eliminated.

Also, with the method for driving the display device 20 according to the present embodiment, in the processing of receiving a training signal, the training signal is received in the PSR-enabled mode, and in the processing of displaying a video by using the video signal received from the external signal source, the video is displayed in the PSR-disabled mode. With this configuration, it is possible to suppress degradation of display quality at the time of transition from the PSR-enabled mode to the PSR-disabled mode while achieving power saving of the entire apparatus (the video display apparatus 1 in the present embodiment) that incorporates the display device 20 configured to support the PSR driving.

[4. Variations]

Thus far, the embodiment of the present disclosure has been described, but the display device driving method and the video display apparatus according to the present disclosure are not limited to those according the embodiment. The present disclosure encompasses variations obtained by making various modifications that can be conceived by a person having ordinary skill in the art to the embodiment described above without departing from the scope of the present disclosure as well as various appliances incorporating the display device according to the present disclosure.

For example, the external signal source 10 and the display device 20 do not need to be incorporated in the same appliance (here, the video display apparatus 1), and they may be incorporated in different appliances. Alternatively, at least one of the external signal source 10 and the display device 20 may be provided as a single unit without being incorporating in an appliance. For example, the external signal source 10 may be incorporated in a hard disk recorder, a DVD recorder, a BD (Blu-ray® Disc) recorder or the like that is connected to the display device 20. That is, the display device driving method according to the present disclosure is not limited to a method for driving a display device incorporated in the same appliance as that in which an external signal source is incorporated, and is also applicable to a display device incorporated in an appliance that is different from that in which an external signal source is incorporated. Also, the display device according to the present disclosure is not limited to the display device of a television set, and is also applicable to a tablet terminal or a monitor that is connected to the above-described external device, digital signage or the like.

Also, in the description given above, the external synchronization signal is transmitted from the external signal source 10, but the external synchronization signal may be superimposed on the video signal. That is, the display device 20 may extract the external synchronization signal from the received video signal and reproduce the video.

Also, in the description given above, the display device 20 is configured to support the PSR driving, but the display device 20 does not need to support the PSR driving. That is, the external signal source 10 and the display device 20 may be connected via an eDP interface that conforms to an eDP standard that does not support the PSR driving, rather than the eDP standard that supports the PSR driving. Furthermore, the external signal source 10 and the display device 20 may be connected via an interface that conforms to a standard that allows two-way communication such as V-by-One® standard or DP (Display Port) standard.

That is, in the description given above, degradation of display quality at the time of transition from the PSR-enabled mode to the PSR-disabled mode is suppressed by transmitting the lock signal at a timing based on the internal synchronization signal of the display device 20. However, the same technique is applicable to a method other than the driving method related to PSR driving. For example, the technique may be applied to, for example, a driving method at the time of activation of the display device 20, a driving method when the external signal source 10 connected to the display device 20 is switched, or the like. In such a case as well, by transmitting the lock signal at a timing based on the internal synchronization signal, it is possible to suppress degradation of display quality at the time of switching to a video based on the video signal from the external signal source.

Also, in the description given above, the frame memory 50 is configured to store, as the information indicating a predetermined image, image data of the final frame in the PSR-disabled mode, but the image data is not limited to the image data of the final frame, and may be compressed image data. Also, the predetermined image may be a fixed image such as a company logo or a black image.

Also, in the description given above, the display device 20 is an organic EL display device including pixels, each of which includes an organic EL element. However, the display device 20 is not limited thereto, and each pixel may include a light emitting element made of a current driven or voltage driven inorganic material, or the display device 20 may be a liquid crystal display device including pixels, each of which includes a liquid crystal display element.

Also, a part or all of the TCON 30 and the frame memory 50 may be implemented as an LSI, which is typically an integrated circuit. The TCON 30 and the frame memory 50 may be individually integrated on a single chip, or may be integrated on a single chip so as to include a part or all of the TCON 30 and the frame memory 50. The above example has been described using an LSI, but the LSI may be called IC, system LSI, super LSI, or ultra LSI according to the degree of integration.

Also, the method for implementing an integrated circuit is not limited to an LSI, and the integration circuit may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Although only one exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a display device driving method and a video display apparatus, and is suitable for, in particular, a method for driving a display device that requires to have high display quality.

The invention claimed is:

1. A display device driving method for driving a display device, the display device driving method comprising:
receiving a training signal, for inquiring whether the display device is ready to accept a video signal representing a moving image, that is transmitted from an external signal source;
after receiving the training signal, transmitting a lock signal, indicating that the display device is ready to accept the video signal, to the external signal source at a timing based on an internal synchronization signal of the display device;
after transmitting the lock signal, receiving the video signal that is transmitted from the external signal source and is synchronous with an external synchronization signal; and
displaying a video by using the video signal received from the external signal source,
wherein in the receiving of the video signal, the external synchronization signal is further received, and
the timing is a timing at which the external synchronization signal is received within an effective window period of the internal synchronization signal in the receiving of the video signal, the effective window period being a period in which a received signal is enabled.

2. The display device driving method according to claim 1,
wherein in the transmitting of the lock signal, when the display device is ready to accept the video signal, the lock signal is transmitted at a timing at which the internal synchronization signal has a predetermined phase.

3. The display device driving method according to claim 1,
wherein the display device includes a memory that stores information indicating a predetermined image, and
in the displaying of the video, the predetermined image being displayed is switched to the video so as to display the video.

4. The display device driving method according to claim 1,
wherein the display device has a PSR-enabled mode in which PSR driving is enabled and a PSR-disabled mode in which the PSR driving is disabled, the term PSR standing for panel self refresh,
in the receiving of the training signal, the training signal is received in the PSR-enabled mode, and
in the displaying of the video, the video is displayed in the PSR-disabled mode.

5. The display device driving method according to claim 1,
wherein the training signal is received when a signal input into the display device switches from a still image to a video signal.

6. The display device driving method according to claim 1,
wherein prior to receipt of the training signal, the display device is in a panel-self-refresh mode displaying a still image, and wherein the training signal is also a signal inquiring of the display device whether to deactivate the panel-self-refresh mode and to transition to a panel-self-refresh-disabled mode in which the display device displays video.

7. The display device driving method according to claim 1, wherein the lock signal is transmitted when the display device is ready to accept the video signal, and the method also transmits a signal, different from the lock signal, to the external signal source indicating that the display device is not ready to accept the video signal when the display device is not ready to accept the video signal.

8. The display device driving method according to claim 1, further comprising setting a range of time during which the transmitting is performed.

9. The display device driving method according to claim 1, wherein the training signal and the video signal are received from the external signal source that is incorporated into a different appliance from the display device.

10. A video display apparatus comprising:
an external signal source having a transmitter for transmitting a training signal, for inquiring whether the display device is ready to accept a video signal representing a moving image; and
a display device,
wherein the display device generates an internal synchronization signal and includes:
a receiver that receives the training signal transmitted by the transmitter of the external signal source;
a second transmitter that transmits a lock signal, indicating that the display device is ready to accept the video signal, to the external signal source at a timing based on a time at which the display device generates the internal synchronization signal, wherein after transmitting the lock signal, the receiver of the display device receives the video signal that is transmitted from the transmitter of the external signal source and is synchronous with an external synchronization signal; and
a display that displays video by using the video signal received from the external signal source by the receiver,
wherein, when the receiver receives the video signal, the external synchronization signal is further received, and
the timing is a timing at which the external synchronization signal is received within an effective window period of the internal synchronization signal when the receiver receives the video signal, the effective window period being a period in which a received signal is enabled.

11. The video display apparatus according to claim 10, wherein the receiver receives the training signal when a signal input into the display device switches from a still image to a video signal.

12. The video display apparatus according to claim 10,
wherein prior to the receiving the training signal, the display device is in a panel-self-refresh mode displaying a still image, and wherein the training signal is also a signal inquiring of the display device whether to deactivate the panel-self-refresh mode and to transition to a panel-self-refresh-disabled mode in which the display device displays video.

13. The video display apparatus according to claim 10, wherein the second transmitter transmits the lock signal when the display device is ready to accept the video signal, and transmits a signal to the external signal source indicating that the display device is not ready to accept the video signal when the display device is not ready to accept the video signal.

14. The video display apparatus according to claim 10, wherein the second transmitter transmits the lock signal during a predetermined range of time.

15. The video display apparatus according to claim 10, wherein the external signal source is part of an appliance in which the display device is included.

16. The video display apparatus according to claim 10, wherein the external signal source is incorporated into a different appliance from the display device.

17. A display device driving method for driving a display device, the display device driving method comprising:
receiving a training signal, for inquiring whether the display device is ready to accept a video signal representing a moving image, that is transmitted from an external signal source;
after receiving the training signal, transmitting a lock signal, indicating that the display device is ready to accept the video signal, to the external signal source at a timing based on an internal synchronization signal of the display device;
after transmitting the lock signal, receiving the video signal that is transmitted from the external signal source and is synchronous with an external synchronization signal;
displaying a video by using the video signal received from the external signal source; and
using a predetermined phase between a start of a next internal synchronization signal and a receipt of the external synchronization signal to determine a time of transmitting of the lock signal.

18. A display device driving method for driving a display device, the method comprising:
receiving a training signal transmitted from an external signal source;
after receiving the training signal, transmitting a lock signal to the external signal source at a timing based on an internal synchronization signal of the display device;
after transmitting the lock signal, receiving a video signal representing a moving image that is transmitted from the external signal source and is synchronous with an external synchronization signal; and
displaying a video by using the video signal received from the external signal source,
wherein the following relationship is satisfied:

$$\Delta Ta < \Delta Tb + \Delta Tc, \text{ where}$$

$\Delta Ta$ is the time from the transmission of the lock signal to the start of the next internal synchronization signal, $\Delta Tb$ is the time from the transmission of the lock signal to the reception of the external synchronization signal, and $\Delta Tc$ is the time from the start of an effective window period during which receipt of the video signal is enabled by the display device and the start of the next internal synchronization signal.

* * * * *